(12) United States Patent
Hall et al.

(10) Patent No.: US 7,521,085 B2
(45) Date of Patent: Apr. 21, 2009

(54) METHOD TO INCORPORATE PIGMENT INTO PAINT BY FORMATION OF RESIN BEADS

(75) Inventors: Jon R. Hall, Oxford, MI (US); Zenon Paul Czornij, Brighton, MI (US)

(73) Assignee: BASF Corporation, Wyandotte, MI (US)

( * ) Notice: Subject to any disclaimer, the term of this patent is extended or adjusted under 35 U.S.C. 154(b) by 481 days.

(21) Appl. No.: 11/314,882

(22) Filed: Dec. 21, 2005

(65) Prior Publication Data
US 2007/0141247 A1    Jun. 21, 2007

(51) Int. Cl.
*B05D 3/00* (2006.01)
(52) U.S. Cl. .................................. 427/213.34
(58) Field of Classification Search ............. 427/213.34
See application file for complete search history.

(56) References Cited

U.S. PATENT DOCUMENTS

| | | | |
|---|---|---|---|
| 3,826,670 A | 7/1974 | Rees | |
| 3,849,152 A | 11/1974 | Mimeault | |
| 4,132,562 A * | 1/1979 | Burke et al. | 523/200 |
| 4,194,920 A * | 3/1980 | Burke et al. | 523/200 |
| 4,771,086 A | 9/1988 | Martin | |
| 5,378,762 A * | 1/1995 | Czornij et al. | 525/187 |
| 5,866,259 A | 2/1999 | Harris et al. | |
| 6,057,384 A | 5/2000 | Nguyen et al. | |
| 6,436,538 B1 * | 8/2002 | Takahashi et al. | 428/403 |
| 2003/0097961 A1 | 5/2003 | Yatake et al. | |

FOREIGN PATENT DOCUMENTS

| | | |
|---|---|---|
| GB | 1 156 653 | 7/1969 |
| JP | 1111 6881 | 4/1999 |
| JP | 2000 281951 | 10/2000 |
| WO | WO 01/92359 | 12/2001 |

* cited by examiner

*Primary Examiner*—Erma Cameron
(74) *Attorney, Agent, or Firm*—Harness, Dickey & Pierce, P.L.C.

(57) ABSTRACT

A coating composition is prepared by polymerizing an addition polymer with a $T_g$ of at least about 60° C. in the presence of a particulate pigment having substantially primary aggregate particles to form encapsulated pigment particles, isolating and drying the encapsulated pigment product, and combining the dried encapsulated pigment product with a coating vehicle.

7 Claims, No Drawings

METHOD TO INCORPORATE PIGMENT INTO PAINT BY FORMATION OF RESIN BEADS

FIELD OF THE INVENTION

The present invention relates to processes for pigmenting coating compositions and for preparing coated articles.

BACKGROUND OF THE INVENTION

A wide variety of pigments are used in paint and coating compositions, each with its own unique structure and properties. Consequently, each different pigment tends behave slightly differently in coating compositions. The different behaviors of the pigments, such as their effects on rheology and viscosity of the coating composition, require special consideration in formulating and manufacturing the coating composition. Further, care must be taken to maintain a stable dispersion of the pigment in the coating composition to prevent settling and color deterioration.

In general, industrial and automotive coatings are pigmented using dry pigments that have been pre-dispersed in a liquid pigment dispersion. The pigment dispersions are prepared by shearing the dry, agglomerated pigment in a liquid resin system to break apart the pigment agglomerates to the primary pigment aggregate particles and to intimately associate the resin with the surface of the pigment particles. These actions are necessary for proper color development of the pigment in the coating. These pigment dispersions can still exhibit certain problems, including settling and seeding during storage and interactions that affect the physical properties of the paint such as rheology and viscosity.

Dispersions of encapsulated pigments have been suggested for certain uses. GB 1 156 653, for example, discloses dispersions of coated pigment particles prepared by steps of grinding or milling the pigment in a solution of polymer and stabilizer, modifying the dispersion to change the organic liquid to a non-solvent, and then encapsulating the disperse particles by a polymer formed by dispersion polymerization of a second polymer that is insoluble in the organic liquid. The change of the organic liquid may be carried out by adding a liquid that is a non-solvent for the polymer or, if the liquid is a mixture of solvent and non-solvents, by removing part of the solvent component, e.g. by evaporation or partition. The process described in GB 1 156 653 is difficult and complicated. The change in the liquid medium from an organic solvent to an organic nonsolvent not only is a step where the pigment may become destabilized if conditions are not carefully controlled, but the step uses a large amount of organic liquids. Thus, the process does not lend itself to modern coatings that limit organic liquids through high solids coatings or aqueous coatings formulations. While the contemporary coatings of GB 1 156 653 in the mid 1960s may have had 83 to 85% by weight volatile organic compounds, today's coatings generally have less than 30% by weight volatile organic compounds. Finally, using pigment dispersed in organic liquid to pigment coatings introduces storage and manufacturing problems that traditional pigment pastes do not have, not the least of which is the storage of a much larger amount of organic liquid with the pigment and introduction of these large amount of organic liquid into the coating composition along with the pigment.

U.S. Pat. No. 3,849,152 describes encapsulating certain inorganic pigments by dispersing the pigments in an organic solvent, polymerizing a polysiloxane polymer in the solvent, and then spray-drying the dispersion to obtain encapsulated pigment particles. The inorganic pigment may have hydroxyl groups reactive with the polysiloxane polymer.

U.S. Pat. No. 3,826,670 describes preparing an encapsulated organic pigment with an intermediate layer of an ionically crosslinked polymer salt, such as a polyvalent metal salt of a polymer of an $\alpha,\beta$-ethylenically unsaturated acid, and an outer skin of a dense, hydrated, amorphous oxide of silicon, zirconium, or titanium. The encapsulated pigment is reported to be chemically inert with excellent dispersibility.

U.S. Pat. No. 4,771,086 describes suspending in aqueous medium a pigment (e.g., $TiO_2$), water-insoluble monomer, and water-soluble, nonionic surfactant. The monomer is addition polymerized using an initiator. The suspension of encapsulated pigment can be used as a paint with improved hiding and color compared with conventional latex paints. U.S. Pat. No. 3,849,152 discloses pigment slurried in, e.g., acetone, hexane, or trichloroethylene, the pigment being completely covered with a polysiloxane liquid that is then polymerized to a solid form to encapsulate the pigment. The pigment preferably has hydroxyl groups reactive with the polysiloxane. The slurry is spray dried and the coated pigment particles collected in a standard cyclone collector and air dried at 100° C. to complete the cure of the encapsulating polysiloxane film.

The abstract of WO 01/92359 discloses polymerically micro-encapsulated pigments for coatings prepared from a particle having an average diameter of 10 nm to 1 mm with a surface first reacted with a compound containing active groups of phosphoric acid, phosphonic acid, sulfonic acid sulfonate, amino or carboxylate groups, then the active groups bonded to the surface are reacted with an initiator containing a leaving group, and, finally, ATRP graft polymerization is carried out on the initiator with at least one olefinically unsaturated monomer.

Encapsulated pigments have been made for use in ink jet inks. U.S. Pat. No. 6,057,384 discloses an aqueous ink jet ink including a colorant associated with core-shell polymers. The monomers of a first polymer are selected to enhance adhesion to the colorant, while the monomers of a second polymer are selected to confer film-forming capability during drying and a durable film after drying. The polymers are associated with the colorant by direct milling in a liquid phase, as in the Examples in columns 26-35 or by a "hot stir" process with polymer and solvent of the first polymer and milling in a liquid phase with the second polymer. The milled pigments are diluted with water to prepare the final ink.

JP 2000 281951 describes dissolving or dispersing a colorant in an oil-soluble solvent, then emulsifying it in water. The emulsion and a resin are dissolved in a water-insoluble organic solvent and phase-inverted to an aqueous emulsion, providing colorant, a surfactant with ethylene oxide chains, and cationic resin-containing particles with average particle size 0.01 to 2.0 microns. The ink gives an image resistant to scratches, markers, and water. JP1111 6881 describes ink jet ink containing pigment encapsulated in a hydrophilic resin that is emulsifiable in water and a hydrophobic resin that is not emulsifiable in water. The ink does not clog ink jet nozzles and is resistant to weather and water. U.S. Patent Application No. 2003/097961 discloses milling together a polymer dissolved in organic solvent with a pigment, adding a crosslinker, emulsifying the mixture in water, removing the organic solvent, and, in the emulsified phase, crosslinking the polymer with the crosslinker. The product is said to be an emulsion of pigment enclosed in a crosslinked polymer. An ink is prepared by gradually adding an aqueous medium containing further ink components to the dispersion of the colorant.

These ink jet ink publications, however, do not address many issues that arise in industrial and automotive coatings, including the issues of forming a continuous, protective coating layer, smoothness of the coating layer, complex rheological behavior required during application and cure of the coating composition, and manufacturing concerns.

Thus, there remains a need for a method that would create an intermediate form of a colorant which would equalize or neutralize the effects of different pigments on the properties of the coating material. This allows the use of an intermediate with better handling and storage characteristics, capable of reducing the number of processing steps required in paint manufacturing.

SUMMARY OF THE INVENTION

The present invention provides a method for preparing a thermosetting coating composition including a step of incorporating into the thermosetting coating composition a solid, particulate pigment encapsulated in an addition polymer having a glass transition temperature of at least about 60° C. The pigment particles are substantially primary aggregate particles. A primary aggregate size refers to a pigment particle that is approximately the smallest aggregate size achievable through tradition pigment dispersion techniques, such as milling. Typical average particle sizes for pigment primary aggregates used in coatings are from about 0.05 micron to about 2.0 microns. The solid, particulate pigment encapsulated in the addition polymer may have an average particle size preferably from about 2 to about 5 microns.

The invention further provides a method of coating a substrate with the thermosetting coating composition of the invention and forming a cured, continuous coating layer from the applied composition. In one embodiment, the encapsulating addition copolymer reacts during curing with another component of the coating composition vehicle. "Vehicle" refers to the film-forming resins and polymers, along with any solvent and/or dispersing liquid in the coating composition.

The present invention allows the manufacture of paints and coatings to be accomplished with a better process for incorporation of pigments into other colorants and for achieving a more uniform behavior, especially regarding rheology and viscosity, between coating compositions that vary only in their pigment content. One aspect of the present invention is that pigments and colorants are captured in a bead or particle form, approximating a sphere shape. Such particles allow long term shelf stability and help reduce or eliminate chemical and physical interactions within the paint system during manufacture and application of coatings. This allows volume preparation of pigments for the incorporation into coatings, and allows for a more accurate and/or metered dispensing of colorants into coatings thereby reducing or eliminating tinting operations. The products created by the process according to the present invention will allow delivery of colorants into a paint or coating in either wet or dry form depending upon the desired process used for the paint of coating manufacture.

Such colored pigment containing beads can be made from a variety of processes and materials. Preferred examples include, among others, thermoset resins, thermoplastic resins, or UV cured resins. Different formulations can account for differing physical properties such as homogeneity in the paint system, resistance to chemical interactions, and other properties that may benefit the coating integrity, durability, or color. The present invention allows the possible design of a resin, or combination of resins used to encapsulate a pigment that exhibit a variety of properties designed to be compatible with the paint system. Such properties include varying from near dissolve within a paint system to very hard and chemical resistant resins. For example, very hard, chemical resistant resins for bead formation would offer the best properties for material handling and storage of the intermediate.

Incorporation of the pigment into the resin according to the present invention is accomplished by a variety of processes, including normal dispersion, and other processes designed to take advantage of the colorant making process, or other kinds of energy, dilutions, distillations, or stresses such as heat.

Advantages from the process according to the present invention in the area of paint making include, among others, making all colorants have the same neutral effect on paint properties, allowing color making by volume metering or weight metering of the colorants, pre-manufacture of the colorant in greater volumes, better quality control, longer shelf life stability, greater versatility of the colorants to be used in a variety of paint technologies with the same coloristic and physical properties. In one aspect of the present invention, the encapsulated pigment could be pourable in a dry state. Such pigments could be sorted specifically by particle size, and packaged and handled better than current forms of colored pigments.

"A" and "an" as used herein indicate "at least one" of the item is present; a plurality of such items may be present, when possible. "About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates a possible variation of up to 5% in the value.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE PREFERRED EMBODIMENTS

The following description of the preferred embodiment(s) is merely exemplary in nature and is in no way intended to limit the invention, its application, or uses.

A thermosetting coating composition is prepared by combining a thermosetting vehicle and at least one solid pigment particle encapsulated in an addition polymer having a glass transition temperature of at least about 60° C. The average particle size of the encapsulated pigment particle product is preferably from about 2 microns to about 5 microns. The pigment contained in the encapsulated particle preferably is a pigment primary aggregate, and may be from about 0.5 to about 2 microns.

The pigments used may be inorganic pigments, including metal oxides, chromates, molybdates, phosphates, and silicates. Examples of inorganic pigments and fillers that could be employed are titanium dioxide, barium sulfate, carbon black, ocher, sienna, umber, hematite, limonite, red iron oxide, transparent red iron oxide, black iron oxide, brown iron oxide, chromium oxide green, strontium chromate, zinc phosphate, silicas such as fumed silica, calcium carbonate, talc, barytes, ferric ammonium ferrocyanide (Prussian blue), ultramarine, lead chromate, lead molybdate, and mica flake pigments. The method is particularly beneficially used with organic pigments. Examples of useful organic pigments are metallized and non-metallized azo reds, quinacridone reds and violets, perylene reds, copper phthalocyanine blues and greens, carbazole violet, monoarylide and diarylide yellows, benzimidazolone yellows, tolyl orange, naphthol orange, and the like.

The addition polymer has a glass transition temperature of at least about 60° C., preferably at least about 100° C. In particular, the glass transition temperature of the addition polymer is selected to avoid sintering of the solid, encapsulated pigment during storage. The encapsulated pigment is preferably usable as a free-flowing particulate material. For this reason, it is also generally advantageous to avoid addition polymer functionalities that would cause strong interactions causing clumping of the encapsulated pigment. On the other hand, the polymer should have good pigment wetting characteristics.

In one preferred method, the encapsulating addition polymer may be formed by emulsifying addition polymerizable monomer in an aqueous dispersion of pigment that has been de-agglomerated, preferably reduced to its primary aggregate particle size, and then carrying out emulsion polymerization of the monomer. The encapsulated pigment particles may be separated from the aqueous medium by an appropriate method, such as air drying or filtering. The product encapsulated pigment particle preferably has an average diameter of from about 2 to about 5 microns.

The emulsion polymer preferably includes crosslinkable functionality such as, without limitation, active hydrogen groups, oxirane groups, carbodiimide groups, and acetoacetoxy groups. The emulsion polymer may be polymerized from a monomer mixture that includes an active hydrogen-functional monomer and, when the active hydrogen-functional monomer is not an acid-functional monomer, preferably also includes an acid-functional monomer. Examples of active hydrogen-functional monomers include, without limitation, hydroxyl-functional monomers such as hydroxyethyl acrylate, hydroxyethyl methacrylate, hydroxypropyl acrylate, hydroxypropyl methacrylate, hydroxybutyl acrylates, and hydroxybutyl methacrylates; acid-functional monomers including acrylic acid, methacrylic acid, and crotonic acid; and carbamate- and urea-functional monomers or monomers with functional groups that are converted to carbamate or urea groups after polymerization such as, without limitation, those disclosed in U.S. Pat. No. 5,866,259, "Primer Coating Compositions Containing Carbamate-Functional Acrylic Polymers," the entire disclosure of which is incorporated herein by reference. Examples of other monomers that can be used to provide crosslinkable functionality include, without limitation, glycidyl acrylate, glycidyl methacrylate, acetoacetoxybutyl methacrylate, acetoacetoxyethyl acrylate, and carbodiimide methacrylate. Preferably, a sufficient amount of active hydrogen-functional monomer is included to produce an equivalent weight of 1000 or less grams per equivalent, more preferably 800 or less grams per equivalent, and even more preferably 600 or less grams per equivalent.

In one preferred embodiment, the emulsion polymer forms an anionic dispersion. Examples of suitable acid-functional monomers include, without limitation, $\alpha,\beta$-ethylenically unsaturated monocarboxylic acids containing 3 to 5 carbon atoms, $\alpha,\beta$-ethylenically unsaturated dicarboxylic acids containing 4 to 6 carbon atoms and the anhydrides and monoesters of these. Examples include, without limitation, acrylic acid, methacrylic acid, crotonic acid, maleic acid or maleic anhydride, itaconic acid or itaconic anhydride, and so on. A sufficient amount of acid-functional monomer is included to produce an emulsion polymer with an acid number of at least about 1, and preferably the emulsion polymer has an acid number of from about 1 to about 10.

In addition to the one or more polymerizable esters of glycidyl esters of tertiary acids, one or more other ethylenically unsaturated monomers are employed as comonomers in forming the emulsion polymers of the invention. Examples of such copolymerizable monomers include, without limitation, derivatives of $\alpha,\beta$-ethylenically unsaturated monocarboxylic acids containing 3 to 5 carbon atoms, including esters, nitriles, or amides of those acids; diesters of $\alpha,\beta$-ethylenically unsaturated dicarboxylic acids containing 4 to 6 carbon atoms; vinyl esters, vinyl ethers, vinyl ketones, vinyl amides, and aromatic or heterocyclic aliphatic vinyl compounds. Representative examples of acrylic and methacrylic acid amides and aminoalkyl amides include, without limitation, such compounds as acrylamide, N-(1,1-dimethyl-3-oxobutyl)-acrylamide, N-alkoxy amides such as methylolamides; N-alkoxy acrylamides such as n-butoxy acrylamide; N-aminoalkyl acrylamides or methacrylamides such as aminomethylacrylamide, 1-aminoethyl-2-acrylamide, 1-aminopropyl-2-acrylamide, 1-aminopropyl-2-methacrylamide, N-1-(N-butylamino)propyl-(3)-acrylamide and 1-aminohexyl-(6)-acrylamide and 1-(N,N-dimethylamino)-ethyl-(2)-methacrylamide, 1-(N,N-dimethylamino)-propyl-(3)-acrylamide and 1-(N,N-dimethylamino)-hexyl-(6)-methacrylamide.

Representative examples of esters of acrylic, methacrylic, and crotonic acids include, without limitation, those esters from reaction with saturated aliphatic and cycloaliphatic alcohols containing 1 to 20 carbon atoms, such as methyl, ethyl, propyl, isopropyl, n-butyl, isobutyl, tert-butyl, 2-ethylhexyl, lauryl, stearyl, cyclohexyl, trimethylcyclohexyl, tetrahydrofurfuryl, stearyl, sulfoethyl, and isobornyl acrylates, methacrylates, and crotonates; and polyalkylene glycol acrylates and methacrylates.

Representative examples of vinyl monomers that can be copolymerized include, without limitation, such compounds as vinyl acetate, vinyl propionate, vinyl ethers such as vinyl ethyl ether, vinyl and vinylidene halides, and vinyl ethyl ketone. Representative examples of aromatic or heterocyclic aliphatic vinyl compounds include, without limitation, such compounds as styrene, $\alpha$-methyl styrene, vinyl toluene, tert-butyl styrene, and 2-vinyl pyrrolidone.

Representative examples of other ethylenically unsaturated polymerizable monomers include, without limitation, such compounds as fumaric, maleic, and itaconic anhydrides (which would provide acid functionality in the emulsion polymer), monoesters (also providing acid functionality), and diesters. Polyfunctional monomers may also be included to provide a partially crosslinked dispersion. Examples of polyfunctional compounds include, without limitation, ethylene glycol diacrylate, ethylene glycol dimethacrylate, triethylene glycol diacrylate, tetraethylene glycol dimethacrylate, 1,4-butanediol diacrylate and dimethacrylate, 1,6-hexanediol diacrylate and dimethacrylate, divinylbenzene, trimethylolpropane triacrylate and trimethacrylate, pentaerythritol tetaacrylate and tetramethacrylate, and so on.

In one embodiment, the encapsulating polymer is a homopolymer or copolymer of styrene.

The monomers may be emulsion polymerized in a single-stage or two-stage polymerization according to well-known methods. In a two-stage polymerization, the first stage monomers are added and polymerized first in the aqueous medium, followed by addition and polymerization of the second stage monomers. The aqueous medium may contain a portion of organic solvent, but preferably less than about 5% of the aqueous medium is organic solvent, and preferably no organic solvent is included in the aqueous medium. Suitable examples of water-miscible organic solvent include, without limitation, esters, alkylene glycol ethers, alkylene glycol ether esters, lower molecular weight aliphatic alcohols, and so on.

Ionic or amphoteric surfactants, such as sodium lauryl sulfate, nonionic surfactants based on polyethoxylated alcohols or polyethoxy-polyalkoxy block copolymers, polyoxyethylenenonylphenyl ethers, polyoxyethylenealkylallyl ether sulfuric acid esters, amino and alkali salts of dodecylbenzenesulfonic acid such as the dimethylethanolamine salt of dodecylbenzenesulfonic acid and sodium dodecylbenzenesulfonic acid, and sodium dioctylsulfosuccinate, are preferably included. The reactor is charged with water and a surfactant. It is preferred to charge from about 0.08% by weight to about 0.5% by weight, preferably from about 0.15% by weight to about 0.35% by weight, based on the total weight of monomers polymerized in the first and second stages, of an anionic surfactant. The combination of monomers to be polymerized in each stage may be pre-emulsified in water and 1% to 5% by weight surfactant, based on monomer weight, before being added to the reactor. The emulsion polymerization is preferably carried out in the presence of a nonionic or an anionic surfactant. Suitable surfactants include, without limitation, polyoxyethylenenonylphenyl ethers, polyoxyethylenealkylallyl ether sulfuric acid esters, amino and alkali salts of dodecylbenzenesulfonic acid such as the dimethylethanolamine salt of dodecylbenzenesulfonic acid and sodium dodecylbenzenesulfonic acid, and sodium dioctylsulfosuccinate.

In general, polymerization is carried out at temperatures from about 30° C. to about 95° C., preferably from about 50° C. to about 90° C.

A suitable initiator capable of producing free radicals is used in the polymerization. Examples of suitable initiators include, without limitation, azo compounds and peroxy compounds such as azodiisobutyronitrile, 4,4-azobis(4-cyanovaleric acid), benzoyl peroxide, lauroyl peroxide, diisopropyl-dicarbonate, t-butyl peroxy-2-ethylhexanoate, peroxyisopivalate, persulfate initiators such as ammonium persulfate, potassium persulfate, and sodium persulfate, and alkali metal peroxydiphosphates, in some cases in combination with reducing agents such as sodium disulfite, hydrazine, hydroxylamine and catalytic amounts of accelerators such as iron, cobalt, cerium, and vanadyl salts, preferably alkali metal or ammonium peroxydisulfates. Chain transfer agents may be added, if desired, to control molecular weight. Typical chain transfer agents include, without limitation, mercaptan compounds such as alkyl mercaptans, e.g., octyl mercaptan and dodecyl mercaptan, mercaptopropionic acid, and esters of mercaptopropionic acid. The polymerization typically proceeds by free radical polymerization. The free radical source is typically supplied by a redox initiator or by an organic peroxide or azo compound. Useful initiators include, without limitation, ammonium peroxydisulfate, potassium peroxydisulfate, sodium metabisulfite, hydrogen peroxide, t-butyl hydroperoxide, dilauryl peroxide, t-butyl peroxybenzoate, 2,2'-azobis(isobutyronitrile), and redox initiators such as ammonium peroxydisulfate and sodium metabisulfite with ferrous ammonium sulfate. Optionally, a chain transfer agent may be used. Typical chain transfer agents include mercaptans such as octyl mercaptan, n- or tert-dodecyl mercaptan, thiosalicylic acid, mercaptoacetic acid, and mercaptoethanol; halogenated compounds; and dimeric alpha-methyl styrene.

The weight ratio of encapsulating polymer to pigment may vary considerably for the encapsulated pigment product. For example, black pigment may have an extremely small primary aggregate size of less than 0.02 micron, but an encapsulated pigment product having an average particle size of less than about 2 microns would be more difficult to handle. Because of this, an encapsulated black pigment may be made with a relatively high ratio of encapsulating addition polymer. In contrast, titanium dioxide pigment would more likely have a primary aggregate particle size of about 1 micron, so an encapsulated titanium dioxide product having average particle size of about 2 microns would include a lower ratio of addition polymer.

The emulsion polymer typically can have weight average molecular weights of from about 5,000 to about 1,000,000. In certain embodiments, the emulsion polymer has a weight average molecular weight from about 10,000 to about 100,000.

The theoretical glass transition temperature of the emulsion polymer can be adjusted according to methods well-known in the art through selection and apportionment of the comonomers. The encapsulating polymer is selected to provide adequate shelf-life for the encapsulated pigment material. The encapsulating polymer should have a glass transition temperature or softening point that is high enough so that the encapsulated pigment material does not significantly sinter during storage. In general, the encapsulating polymer should have a glass transition temperature or softening point above the storage temperature, preferably at least about 60° C., more preferably at least about 100° C. The encapsulating polymer may or may not coalesce into the coating film during curing or baking of an applied coating layer.

The amount of encapsulated pigment added to a coating composition may vary considerably, depending on the desired color properties. The encapsulated pigments may be used in the coating compositions in amounts typically of up to 40% by weight pigment, based on total weight of the coating composition. The addition polymer encapsulating the particulate pigment preferably does not dissolve in the coating solvent medium. In some embodiments of the invention, however, some partial or full dissolution of the encapsulating addition polymer may provide desirable color properties in the coating layer prepared from the coating composition.

Additional agents, for example hindered amine light stabilizers, ultraviolet light absorbers, anti-oxidants, surfactants, stabilizers, wetting agents, rheology control agents, dispersing agents, adhesion promoters, etc. may be incorporated into the coating composition. Such additives are well-known and may be included in amounts typically used for coating compositions.

Coating compositions can be coated on the article by any of a number of techniques well-known in the art. These include, for example, spray coating, dip coating, roll coating, curtain coating, and the like. For automotive body panels, spray coating is preferred.

The coating composition can be applied onto many different substrates, including metal substrates such as bare steel, phosphated steel, galvanized steel, or aluminum; and non-metallic substrates, such as plastics and composites. The substrate may also be any of these materials having upon it already a layer of another coating, such as a layer of an electrodeposited primer, or primer surfacer.

The coating composition can be applied in one or more passes to provide a film thickness after cure of typically from about 20 to about 100 microns. After application of the pigmented coating composition to the substrate, the applied coating layer may be overcoated with a layer of a clearcoat coating composition, before or after curing of the pigmented layer, but preferably before with the pigmented coating layer and the clearcoat coating layer being cured at the same time in the industry standard "wet-on-wet" method.

The coating is cured, preferably by heating at a temperature and for a length of time sufficient to cause the reactants to form an insoluble polymeric network. The cure temperature is usually from about 105° C. to about 175° C., and the length of cure is usually about 15 minutes to about 60 minutes. Preferably, the coating is cured at about 120° C. to about 150° C. for about 20 to about 30 minutes. Heating can be done, for example, in infrared and/or convection ovens.

The invention is further described in the following examples. The examples are merely illustrative and do not in any way limit the scope of the invention as described and claimed. All parts are parts by weight unless otherwise noted.

EXAMPLE

A slurry is prepared by mixing 100 grams of titanium dioxide in 400 grams deionized water. The slurry is mixed in a Cowles disperser for about 30 minutes, until the slurry particles are smaller than 10 microns.

To the slurry is added 20 grams of a monomer mixture (20% by weight styrene, 30% by weight hydroxyethyl methacrylate, 45% by weight butyl methacrylate, and 5% by weight acrylic acid) is emulsion polymerized, stabilized with ABEX EP 110 (anionic surfactant available from Rhodia). The polymerization reaction is initiated by ammonium persulfate. The emulsion polymer forms on the pigment particle surfaces. The product slurry is filtered to isolate the pigment. The pigment is rinsed with deionized water and dried to yield the encapsulated pigment product.

A coating is prepared using the encapsulated pigment product. With rapid stirring, 20 parts by weight of an unpigmented coating mixture (30% solids, comprising as solid binder 70% of an anionic acrylic and 30% hexa(methoxymethyl)melamine) and a 10 parts by weight of a pigment dispersion (prepared by slurrying 6 parts by weight of the encapsulated pigment product in a combination of 2 parts by weight of polyester resin and 2 parts by weight propylene glycol n-propyl ether, then adding 0.44 parts by weight of a 20% aqueous solution of amine). Stirring is continued for about thirty minutes.

The pigment in the resultant coating composition is stable.

The coating composition is applied by spraying onto a metal substrate (pre-primed). The applied coating is cured by baking the coated substrate for 20 minutes at 265° F.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of preparing a coating composition, comprising:
   (a) preparing a mixture of water, a portion of addition polymerizable monomer or monomers, and a particulate pigment having primary aggregate particles;
   (b) emulsion polymerizing the portion of addition polymerizable monomer or monomers to produce an addition polymer, wherein the portion of addition polymerizable monomer or monomers is selected so that the addition polymer has a glass transition temperature of at least about 60° C. and encapsulates the pigment particles to form encapsulated pigment particles;
   (c) removing the encapsulated pigment particles from the water to form a dry, particulate, encapsulated pigment product; and
   (d) combining the pigment product with a vehicle comprising at least one resin, at least one crosslinker for the resin, and at least one member selected from the group consisting of water and organic liquids to form a coating composition.

2. A method according to claim 1, wherein the encapsulated pigment particles have an average particle size of from about 2 microns to about 5 microns.

3. A method according to claim 1, wherein the addition polymer has a glass transition temperature of at least about 100° C.

4. A method according to claim 1, wherein the addition polymer is a homopolymer or copolymer of styrene.

5. A method according to claim 1, wherein, when the coating composition is applied to a substrate and cured to form a coating film, the addition polymer forms a part of the coating film.

6. A method according to claim 5, wherein the addition polymer reacts with a component of the vehicle when the composition applied to the substrate is cured.

7. A method according to claim 1, wherein the particulate pigment having primary aggregate particles is obtained by de-agglomeration of the pigment in the water before preparing the mixture with the monomer or monomers.

* * * * *